United States Patent [19]
Misencik

[11] Patent Number: 5,541,800
[45] Date of Patent: Jul. 30, 1996

[54] REVERSE WIRING INDICATOR FOR GFCI RECEPTACLES

[75] Inventor: John Misencik, Shelton, Conn.

[73] Assignee: Hubbell Incorporated, Orange, Conn.

[21] Appl. No.: 408,397

[22] Filed: Mar. 22, 1995

[51] Int. Cl.⁶ .................................................. H02H 3/16
[52] U.S. Cl. ................................ 361/45; 335/18; 361/46; 361/50
[58] Field of Search .................................. 361/45, 49, 46, 361/50, 42, 44, 47, 48; 340/652; 335/18; 29/593

[56] References Cited

U.S. PATENT DOCUMENTS

| | | | |
|---|---|---|---|
| 3,936,699 | 2/1976 | Adams | 317/18 |
| 4,063,299 | 12/1977 | Munroe | 361/45 |
| 4,386,338 | 5/1983 | Doyle et al. | 340/310 |
| 4,412,193 | 10/1983 | Bienwald et al. | 335/18 |
| 4,442,470 | 4/1984 | Misencik | 361/46 |
| 4,518,945 | 5/1985 | Doyle et al. | 340/310 |
| 4,538,040 | 8/1985 | Ronemus et al. | 200/159 |
| 4,567,544 | 1/1986 | Ronemus et al. | 361/399 |
| 4,568,997 | 2/1986 | Bienwald et al. | 361/45 |
| 4,574,324 | 3/1986 | Packard | 361/46 |
| 4,595,894 | 6/1986 | Doyle et al. | 335/18 |
| 4,618,907 | 10/1986 | Leopold | 361/45 |
| 4,709,293 | 11/1987 | Gershen et al. | 361/50 |
| 4,739,450 | 4/1988 | Misencik | 361/394 |
| 4,831,496 | 5/1989 | Brant et al. | 361/394 |
| 5,166,853 | 11/1992 | Gershen et al. | 361/50 |
| 5,184,271 | 2/1993 | Doyle et al. | 361/49 |
| 5,202,662 | 4/1993 | Bienwald et al. | 335/18 |
| 5,363,269 | 11/1994 | McDonald | 361/45 |
| 5,477,412 | 12/1995 | Neiger et al. | 361/45 |

*Primary Examiner*—Jeffrey A. Gaffin
*Assistant Examiner*—Michael J. Sherry
*Attorney, Agent, or Firm*—Jerry M. Presson; John E. Holmes

[57] ABSTRACT

A reverse wiring indicator for a GFCI receptacle alerts the installer in the event that the AC source has been improperly wired to the load or feedthrough terminals of the receptacle rather than to the source or input terminals. The reverse wiring indicator operates by open-circuiting one of the load or feedthrough terminals of the receptacle, and may take the form of a removable barrier which inhibits conduction through one of the power contact sets of the GFCI circuit breaker until the receptacle has been installed and successfully tested. The contact set through which conduction is inhibited is the one other than that to which the TEST switch is connected, and the other contact set is allowed to conduct in the normal manner. The removable barrier prevents a current path from being established through the load or feedthrough terminals of the receptacle in the event that the receptacle has been miswired, thereby preventing the TEST switch from falsely tripping the circuit breaker in that situation, but does not prevent the TEST switch from operating normally to trip the circuit breaker if the receptacle has been properly wired. The removable barrier may be provided in the form of a thin strip of electrically insulating material (such as Mylar tape) which is held between one set of closed power contacts and protrudes through the front of the receptacle housing so that it is conspicuous and easily removable.

20 Claims, 5 Drawing Sheets

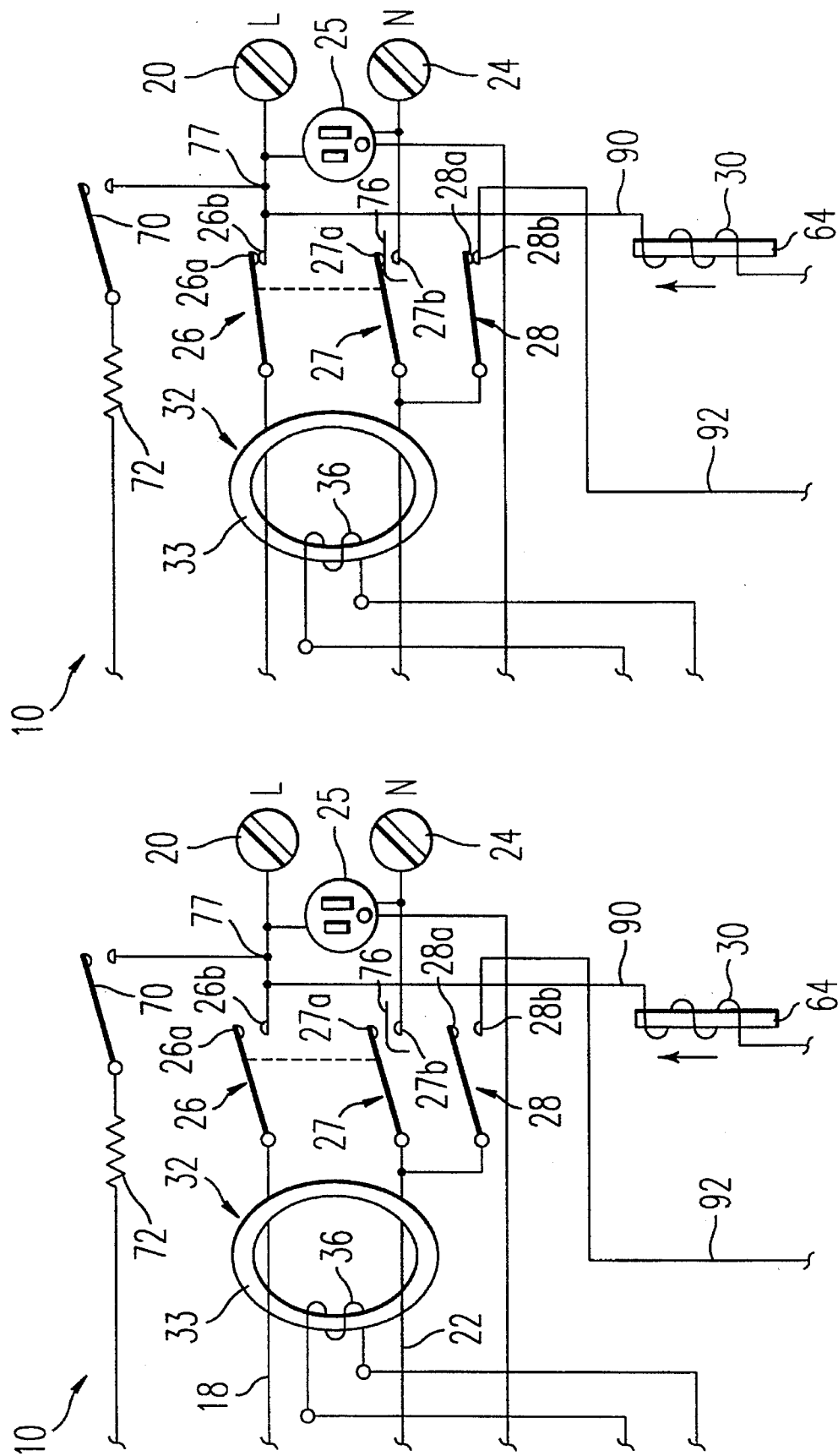

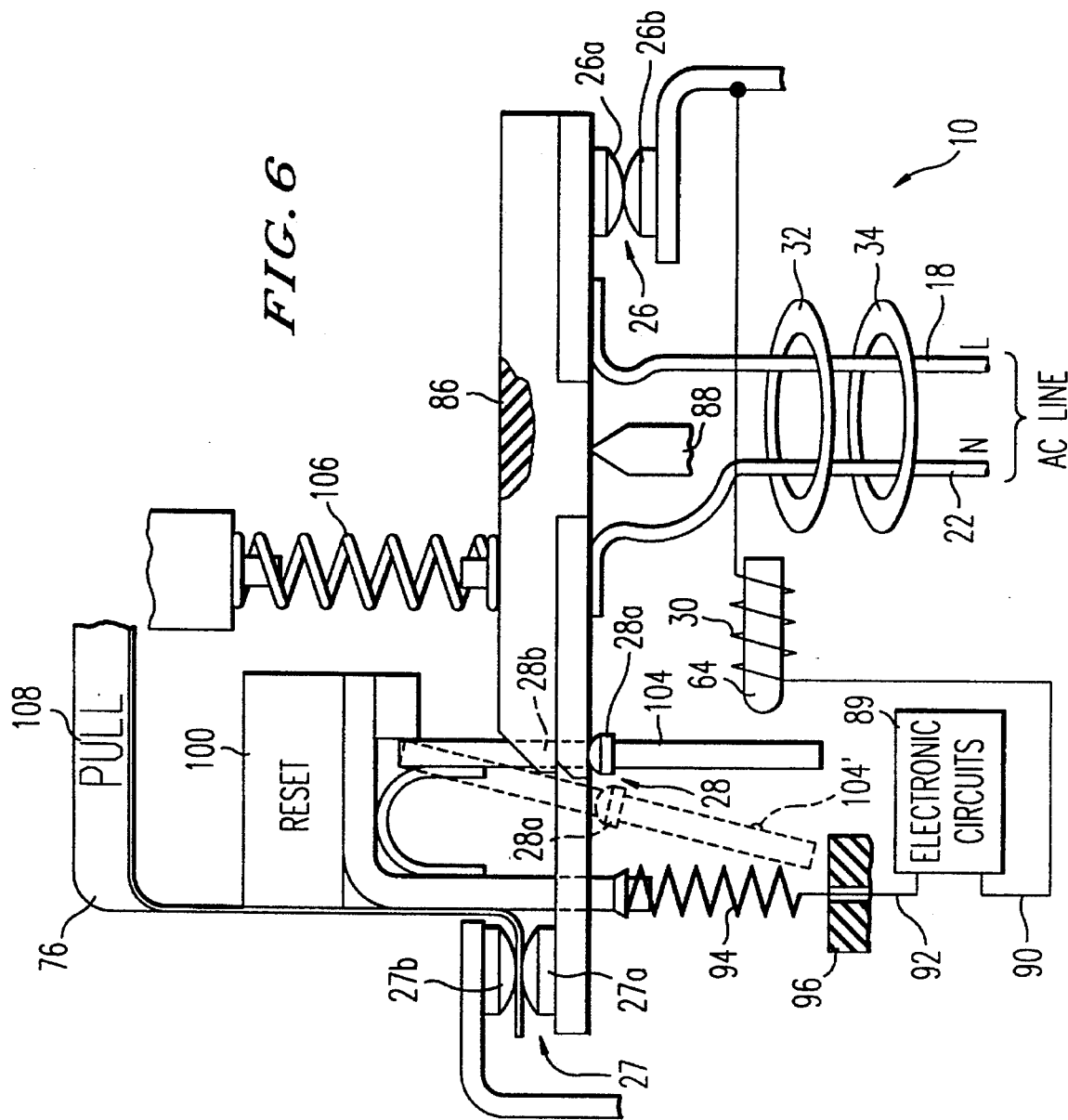

REVERSE WIRING INDICATOR FOR GFCI RECEPTACLES

FIELD OF THE INVENTION

The present invention relates to a ground fault circuit interrupter (GFCI) device for protecting an AC load circuit. More specifically, the invention relates to a GFCI AC receptacle with a reverse wiring indicator for alerting an installer in the event that the receptacle has been improperly wired.

BACKGROUND OF INVENTION

Ground fault circuit interrupter (GFCI) devices are designed to trip in response to the detection of a ground fault condition at an AC load. Generally, the ground fault conditions results when a person comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the load.

GFCI devices have been provided in various forms, including portable or line cord devices and central units which provide protection for the AC wiring throughout a structure. More commonly, however, GFCI devices are incorporated into wall-mounted AC electrical receptacles which are designed for installation at various locations within a building. A typical receptacle configuration consists of a housing adapted to be received within a standard electrical box, with a pair of standard two- or three-prong AC outlets, a test pushbutton and a reset pushbutton accessible through the front of the housing. At the rear of the housing, two pairs of screw terminals are ordinarily provided. One pair of screw terminals allows the line and neutral sides of an AC source to be connected to the GFCI receptacle, and these terminals (referred to as the source or input terminals) are connected to the electrical outlets at the front of the housing via the GFCI circuitry and circuit breaker within the housing. The second pair of screw terminals, which are sometimes referred to as load or feedthrough terminals, are connected directly in parallel with the contacts of the AC outlets. This provides the installer with the option of connecting a standard, non-GFCI AC receptacle in parallel with the GFCI receptacle, in order to provide ground fault protection for the standard receptacle without the need to provide a separate GFCI circuit. The standard receptacle may be located remotely from the GFCI receptacle, but will ordinarily be close enough (e.g., in the same room) so that convenient resetting is possible when a ground fault condition occurs.

Unfortunately, there is a problem with GFCI receptacles of the type described above, in that the installer may erroneously connect the incoming AC source conductors to the load or feedthrough terminals of the receptacle rather than to the source or input terminals. Because of the nature of the internal wiring of the GFCI receptacle, this miswiring condition is not easily detected. AC power will still be present at the receptacle outlets, making it appear that the receptacle is operating normally. If the test pushbutton is depressed, the circuit breaker within the GFCI receptacle will be released and the reset pushbutton will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

It is known to provide a GFCI receptacle with a visual indicator, such as a light-emitting diode (LED), to indicate that the circuit to which the receptacle is connected is operating normally. Such an arrangement is illustrated, for example, in U.S. Pat. Nos. 4,412,193, 4,568,997 and 5,202,662, all to Bienwald et al. If the receptacle has been wired properly, the LED is extinguished when a ground fault condition occurs. However, in the event that the receptacle has been miswired by connecting the AC source to the load terminals rather than to the input terminals, the LED is not extinguished when a ground fault condition occurs. Thus, when the test button is depressed to simulate a ground fault condition, the LED will remain illuminated to serve as an indication that the receptacle has been miswired. Unfortunately, however, the installer of the receptacle cannot necessarily be relied upon to understand the operation of the LED unless the installer is familiar with the type of GFCI receptacle being installed. That is, the failure of the LED to extinguish after the test button is depressed may not be interpreted by the installer as an abnormal condition, particularly since the installer will observe the popping out of the reset button that occurs during a successful test of a properly wired GFCI receptacle. Thus, the miswiring of the receptacle may not be detected and a dangerous condition may be allowed to persist.

SUMMARY OF THE INVENTION

A primary object of the present invention is to provide a GFCI receptacle which, if inadvertently miswired by connecting the AC source to the load or feedthrough terminals of the receptacle rather than to its input or source terminals, affords a positive indication to the installer that a miswiring condition exists.

A further object of the present invention is to provide a reverse wiring indicator which is suited for use in AC receptacles containing integral GFCI circuitry, and which requires little or no modification to the GFCI circuitry or to the receptacle hardware.

Still another object of the present invention is to provide a reverse wiring indicator for a conventional type of GFCI receptacle having test and reset pushbuttons, with the operation of the reverse wiring indicator being such that the existence of a miswiring condition prevents the reset pushbutton from popping out when the test pushbutton is depressed, thereby providing a positive indication to an installer that a wiring error has occurred.

Still another object of the present invention is to provide a reverse wiring indicator for a GFCI device in which a visual indicator, such as a neon bulb or light-emitting diode (LED), can be used to provide a supplemental indication that a miswiring condition has occurred.

The foregoing objects are substantially achieved by providing a ground fault circuit interrupter for an electrical receptacle in which a removable barrier is employed to temporarily open-circuit one of the load or feedthrough terminals of the receptacle while the receptacle is being installed and tested, in order to prevent the GFCI circuit breaker of an improperly wired receptacle from tripping when the test pushbutton is depressed. The ground fault circuit interrupter comprises first and second input terminals for connection to the line and neutral sides, respectively, of an AC source, as well as first and second output terminals for connection to the line and neutral sides, respectively, of an AC receptacle outlet. First and second conductive paths extend, respectively, between the first input terminal and first output terminal and between the second input terminal and second output terminal. First and second sets of electrical contacts are connected in the first and second conductive paths, respectively, in order to selectively connect the input terminals to the output terminals when the contact sets are closed, and to selectively disconnect the input terminals from the output terminals when the contact sets are open. A control circuit is provided for causing the first and second contact sets to open in response to an imbalance in current flow through the first and second conductive paths that is indicative of a ground fault condition at an AC load connected to the AC receptacle outlet. A test switch selectively connects the first or second input terminal to the second or first output terminal, respectively, in order to simulate an imbalance in the current flow through the first and second conductive paths and to thereby cause the control circuit to open the first and second contact sets. A removable barrier is interposed between the contacts of the contact set that is connected to the output terminal other than that to which the test switch is connected. The removable barrier prevents a return current path from being established through the contacts of the contact set in response to actuation of the test switch under circumstances in which the AC source has been erroneously connected to the output terminals of the ground fault circuit interrupter, rather than to the input terminals. In a preferred embodiment of the invention, the removable barrier comprises a strip of electrically insulating material which prevents electrical conduction between the contacts of the contact set when the contacts are in their closed state.

In another aspect, the present invention is also directed to an integral AC receptacle and ground fault circuit interrupter for protecting the receptacle. The receptacle comprises a housing and first and second terminals carried by the housing for connection to the line and neutral conductors, respectively, of an AC source. At least one receptacle outlet is carried by the housing for receiving an AC line cord plug, with the outlet having first and second contacts which are electrically connected to the first and second terminals of the receptacle. The housing also carries third and fourth terminals which are electrically connected to the first and second contacts of the receptacle outlet, respectively, for optionally connecting the AC receptacle in parallel with a remote AC receptacle for which ground fault protection is desired. First and second sets of electrical contacts selectively connect the first and second terminals to the first and second contacts, respectively, of the receptacle outlet when the contact sets are in a closed position, and selectively disconnect the first and second terminals from the first and second contacts, respectively, of the receptacle outlet when the contact sets are in an open position. A manually resettable latching mechanism is provided for releasably latching the first and second contact sets in the closed position, with the latching mechanism being actuated by a RESET pushbutton carried by the housing. A control circuit detects an imbalance in the current flow through the line and neutral sides of the receptacle outlet that is indicative of a ground fault condition at an AC load connected to the receptacle outlet. An electrical solenoid is operated by the control circuit for deactuating the latching mechanism to open the first and second contact sets when a ground fault condition is detected. A test switch selectively connects the first or second terminal of the receptacle to the second or first contact, respectively, of the receptacle outlet in order to simulate an imbalance in the current flow through the receptacle outlet and thereby cause the control circuit and the electrical solenoid to open the first and second contact sets. The test switch is operated by a TEST pushbutton carried by the housing. A removable barrier is interposed between the contacts of the contact set that is connected to the contact of the receptacle outlet other than that to which the test switch is connected. The removable barrier prevents a return current from being established through the contacts of the contact set in response to actuation of the test switch under circumstances in which the AC source has been erroneously connected to the third and fourth terminals of the receptacle, rather than to the first and second terminals.

The present invention is also directed to a method for testing for improper wiring of an AC ground fault circuit interrupter receptacle having a set of AC source terminals, a receptacle outlet connected to the source terminals, a pair of AC load terminals connected in parallel with the receptacle outlet, first and second latching contact sets connected in series between the source terminals and the receptacle outlet, a control circuit for releasing the contact sets to disconnect the source terminals from the receptacle outlet and load terminals in response to a ground fault condition, and a test switch for simulating a ground fault condition by selectively connecting one of the source terminals to the load terminal of opposite polarity. The method comprises the steps of latching the first and second contact sets, temporarily open-circuiting at least one of the AC load terminals, operating the test switch while the open circuit exists at the AC load terminal, and observing whether the operation of the test switch causes the contact sets to be released. The step of temporarily creating an open circuit at the AC load terminal may comprise the step of temporarily inhibiting conduction through the contact set connected to the AC load terminal other than that to which the test switch is connected, and the method may comprise the further step of restoring conduction through the contact set if operation of the test switch is observed to cause the first and second contact sets to be released.

BRIEF DESCRIPTION OF THE DRAWINGS:

Referring now to the drawings, which form a part of the original disclosure:

FIG. 2 is a modified schematic diagram of a portion of the GFCI receptacle circuit shown in FIG. 1, illustrating the manner in which a removable contact barrier may be employed to allow detection of a reverse wiring condition in accordance with the present invention;

FIG. 3 is a partial schematic diagram similar to that of FIG. 2, with the internal circuit breaker of the GFCI receptacle shown in the closed or conducting position and with the removable contact barrier in place to prevent conduction between one pair of contacts of the GFCI circuit breaker;

FIG. 6 is a diagram of a mechanical circuit breaker which may be used in the GFCI receptacle, illustrating one way in which the removable contact barrier may be provided.

Figure 1:
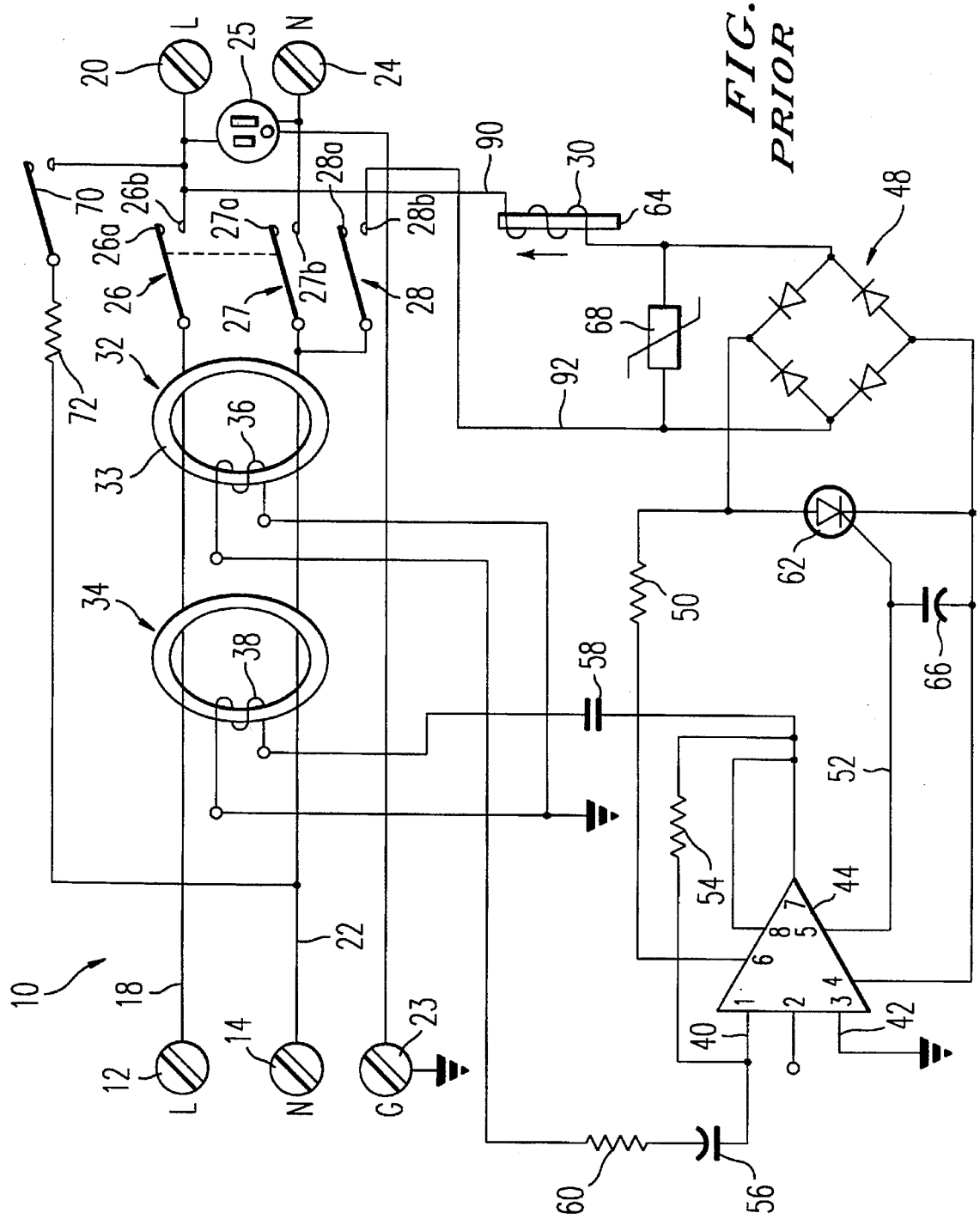
FIG. 1 is a schematic diagram of an existing type of GFCI receptacle circuit in which the present invention may be employed.

DETAILED DESCRIPTION OF THE PREFERRED EMBODIMENTS:

FIG. 1 is a schematic diagram of an existing type of GFCI receptacle circuit 10 in which a reverse wiring indicator in accordance with the present invention may be employed. The schematic diagram shown-represents the Model GFR 52 FT 120-volt AC, 5-milliampere trip level GFCI receptacle manufactured by Hubbell Incorporated, the assignee of the present invention, but it will be understood that the present invention is not limited to any particular type of GFCI circuit. The GFCI receptacle includes a pair of screw-type input or source terminals 12 and 14 which are adapted to be connected to the line (L) and neutral (N) terminals, respectively, of an AC source. Within the GFCI receptacle, a first conductor 18 connects the AC line source terminal 12 to a corresponding screw-type AC line output or load terminal 20, and a second conductor 22 connects the AC neutral source terminal 14 to a corresponding screw-type AC neutral output or load terminal 24. The output or load terminals 20 and 24 (also known as feedthrough terminals) are connected, respectively, to the line and neutral contacts of an AC receptacle outlet 25. The load terminals 20 and 24 allow the GFCI receptacle to be connected in parallel to a standard, non-GFCI receptacle (not shown) for which ground fault protection is desired, without the need to provide a separate GFCI circuit for the additional receptacle. If the additional receptacle is not needed, the load terminals 20 and 24 are ordinarily left unconnected.

It will be understood that, in an integral GFCI receptacle of the type in which the present invention will have its principal utility, the AC source terminals 12, 14 and AC load terminals 20, 24 will typically be mounted on the outside of the receptacle housing so that appropriate connections can be made to these terminals by an installer. Also, the receptacle 10 will ordinarily have a pair of two- or three-prong receptacle outlets 25 connected to each other in parallel, although only one receptacle outlet 25 is illustrated in FIG. 1 in the interest of simplicity. A ground screw terminal 23, also mounted on the outside of the receptacle housing, is connected to the ground contact of the receptacle outlet 28 and to a metal yoke or frame (not shown) in which the receptacle housing is carried.

The conductive paths established by the conductors 18 and 22 in FIG. 1 are selectively made and broken by first and second contact sets 26 and 27, respectively, in order to selectively connect and disconnect the source terminals 12 and 14 from the load terminals 20 and 24 and receptacle outlet 25. The first contact set 26 includes first and second contacts 26a and 26b, respectively, and the second contact set 27 similarly includes first and second contacts 27a and 27b, respectively. A third contact set 28 comprising contacts 28a and 28b is also provided for a purpose to be described shortly. The contact sets 26, 27 and 28 form a part of a normally closed, mechanically latching circuit breaker which is operated by a RESET pushbutton (not shown in FIG. 1) located on the exterior of the GFCI receptacle housing. When the contact sets 26 and 27 are latched in the closed or conducting state, continuous conductive paths exist between the source terminals 12, 14 and the load terminals 20, 24 to deliver power from the AC source to the receptacle outlet 25 (and to any remote receptacle connected to the load terminals 20 and 24). When a ground fault condition is detected, a solenoid trip coil 30 is energized and causes the contact sets 26 and 27 to open, thereby preventing an electrical shock hazard by immediately and simultaneously removing power from both sides of the AC load terminals 20, 24 and receptacle outlet 25.

In order to detect a ground fault condition, the GFCI receptacle 10 includes a sensing transformer 32 through which the AC line and neutral conductors 18 and 22 extend as primary windings. The conductors 18 and 22 also extend as primary windings through an additional sensing transformer 34 which serves as a grounded neutral transformer. The secondary winding 36 of the of the sensing transformer 32 is connected across the inputs 40 and 42 of an amplifier and trip circuit 44. The amplifier and trip circuit 44 is preferably a Type RV 4145 integrated circuit manufactured by the Semiconductor Division of Raytheon Company, located in Mountain View, Calif. The secondary coil 38 of the grounded neutral transformer 34 is connected between the input terminals 42 and 46 of the amplifier and trip circuit 44. The amplifier and trip circuit 44 is powered from the AC source terminals 12 and 14 by means of a power supply comprising a full-wave bridge rectifier 48 and a 24 kilohm, ½-watt current limiting resistor 50. In operation, the sensing transformer 32 serves as a differential transformer for detecting a current leakage between the line side of the AC receptacle 25 (or the load terminal 20) and an earth ground, while the sensing transformer 34 detects current leakage between the neutral side of the AC receptacle outlet 25 (or the load terminal 24) and an earth ground. In the absence of a ground fault condition, the currents flowing through the conductors 18 and 22 will be equal and opposite, and no net flux will be generated in the core 33 of the differential transformer 32. In the event that a connection occurs between the line side of the AC receptacle 25 (or the load terminal 20) and ground, however, the current flowing through the conductors 18 and 22 will no longer precisely cancel and a net flux will be generated in the core 33 of the transformer 32. This flux will give rise to a potential at the output of the secondary coil 36, and this output is applied to the inputs 40 and 42 of the amplifier and trip circuit 44 to produce a trip signal on the output line 52. If the ground fault condition results from the neutral side of the AC receptacle outlet 25 (or the neutral load terminal 24) being connected to ground, a magnetic path is established between the differential transformer 32 and the grounded neutral transformer 34. When this occurs, a positive feedback loop is created around an operational amplifier within the amplifier and trip circuit 44, and the resulting oscillations of the amplifier will likewise give rise to the trip signal on the output line 52.

Since the amplifier and trip circuit 44 is a commercially available component, its operation is well known and need not be described in detail. In utilizing this device, a 1.4-megohm, ¼-watt, 1% resistor 54 is utilized as a feedback resistor for setting the gain of the circuit and hence its sensitivity to ground faults. The capacitors 56 and 58 (preferably having values of 10 microfarads and 0.0068 microfarads and ratings of 6 volts DC and 100 volts DC, respectively) provide AC input coupling. A 150-ohm resistor 60 provides protection for the input of the amplifier and trip circuit 44 under severe fault conditions, such as a short circuit between the line side of the AC receptacle 25 (or the AC load terminal 20) and ground.

In the absence of a ground fault condition, no output is produced by the amplifier and trip circuit 44 on line 52. Under these circumstances, a silicon controlled rectifier (SCR) 62 connected across the output terminals of the full-wave bridge rectifier 48 is maintained in a nonconducting state. Since the current drawn by the resistor 50 and amplifier and trip circuit 44 is not sufficient to operate the solenoid trip coil 30, the solenoid plunger 64 remains motionless and the contact sets 26, 27 and 28 remain closed. The occurrence of a ground fault condition causes the amplifier and trip circuit 44 to produce an output on line 52 which is applied to the gate terminal of the SCR 62, thereby rendering the SCR 62 conducting. This produces a short circuit across the outputs of the full-wave bridge rectifier 48, thereby providing a low-impedance path for current to flow through the solenoid trip coil 30. The resulting movement of the solenoid plunger 64 causes the contact sets 26, 27 and 28 to move to the open position shown in FIG. 1, thereby removing power from the receptacle outlet 25 and from the load terminals 20 and 24. Opening of the contact set 28 has the effect of disconnecting the AC neutral input to the full-wave bridge rectifier 48, thereby removing power from the solenoid trip coil 30 and from the amplifier and trip circuit 44. This is desirable in that line current from the AC source is positively prevented from passing through the SCR 62 after the ground fault condition has occurred, even if the SCR 62 continues to be gated as a result of internal circuit capacitances. The physical arrangement of the contact sets 26, 27 and 28 is preferably such that the contacts 28a and 28b close before the contacts 27a and 27b when the GFCI receptacle is manually reset. This ensures that the GFCI receptacle will be in a condition to detect a ground fault condition immediately upon being reset. The contacts 28a and 28b are also arranged to open before the contacts 27a and 27b when a ground fault condition occurs, in order to immediately disable and protect the amplifier and trip circuit 44 and SCR 62.

A capacitor 66 is connected between the gate and cathode of the SCR 62 to serve as a filter for preventing narrow noise pulses from triggering the SCR. The circuit shown in FIG. 1 also includes a metal oxide varistor (MOV) 68 connected across the input terminals of the full-wave bridge rectifier 48, in order to protect the amplifier and trip circuit 44 and SCR 62 from transient voltage surges.

In order to allow the GFCI receptacle 10 to be tested for proper operation, a test circuit comprising a momentary pushbutton TEST switch 70 connected in series with a 15 kilohm, ¼-watt current limiting resistor 72 is connected between the conductor 18 at a point on the load or outlet side of the contact set 26 and the conductor 22 at a point on the AC source side of the sensing transformers 32 and 34. When the TEST switch 70 is momentarily depressed, sufficient current will flow through the resistor 72 to cause an imbalance in the current flowing through the primary coil of the transformer 32. This will simulate a ground fault condition, causing the amplifier and trip circuit 44 to produce an output signal on line 52 that gates the SCR 62 into conduction and thereby momentarily energizes the solenoid trip coil 30. The resulting movement of the solenoid plunger 64 causes the contact sets 26, 27 and 28 to open, as will occur during an actual ground fault condition, and this in turn de-energizes the load terminals 20 and 24, receptacle outlet 25, solenoid trip coil 30 and amplifier and trip circuit 44. The opening of the contact sets 26, 27 and 28 will be evident from the popping out of the RESET pushbutton, which is mechanically interconnected with the contact sets 26, 27 and 28. If this does not occur, the user or installer is alerted to the fact that the GFCI receptacle 10 is defective and requires repair or replacement.

In the installation of a GFCI receptacle of the type illustrated in FIG. 1, an installer will sometimes erroneously connect the incoming AC source to the load or feedthrough terminals 20 and 24 rather than to the input or source terminals 12 and 14. This reverse wiring is not readily apparent to the installer or to the ultimate user, because AC power will exist at the receptacle outlet 25 and will thereby make it appear that the receptacle is operating normally. In addition, when the TEST pushbutton 70 is depressed, a current will flow through the test circuit and through the portion of the neutral conductor 22 that passes through the sensing transformers 32 and 34, as a result of the AC potential applied across the load terminals 20 and 24. The resulting current imbalance between the line and neutral conductors 18 and 22 will be detected by the sensing transformer 32 and the contact sets 26, 27 and 28 will open, again making it appear that the GFCI receptacle is operating normally. In reality, however, no ground fault protection is being provided because the incoming AC source is wired directly to the receptacle outlet 25 rather than indirectly to the receptacle outlet through the contact sets 26 and 27. The miswiring condition can be detected if an operating electrical load is plugged into the receptacle outlet 25 when the TEST pushbutton 70 is depressed, since the load will continue to be energized even after the RESET button has popped out. However, neither the installer nor the ultimate user can be relied upon to test the GFCI receptacle in this manner, since the popping out of the RESET button is ordinarily taken as a sufficient indication that the receptacle is operating normally.

In accordance with the present invention, a simple and effective indication of a reverse wiring condition is obtained by temporarily open-circuiting at least one of the load terminals of the GFCI receptacle until the receptacle has been installed and successfully tested. Preferably, this is done by temporarily inhibiting conduction through the contact set associated with the load terminal other than that to which the TEST switch is connected, through the use of a removable insulating barrier or other means. This prevents a current path from being established through the load terminals of the receptacle in the event that the receptacle has been miswired, thereby preventing the TEST switch from falsely tripping the receptacle circuit breaker, but does not prevent the TEST switch from operating normally to trip the circuit breaker if the receptacle has been properly wired.

Figure 4:
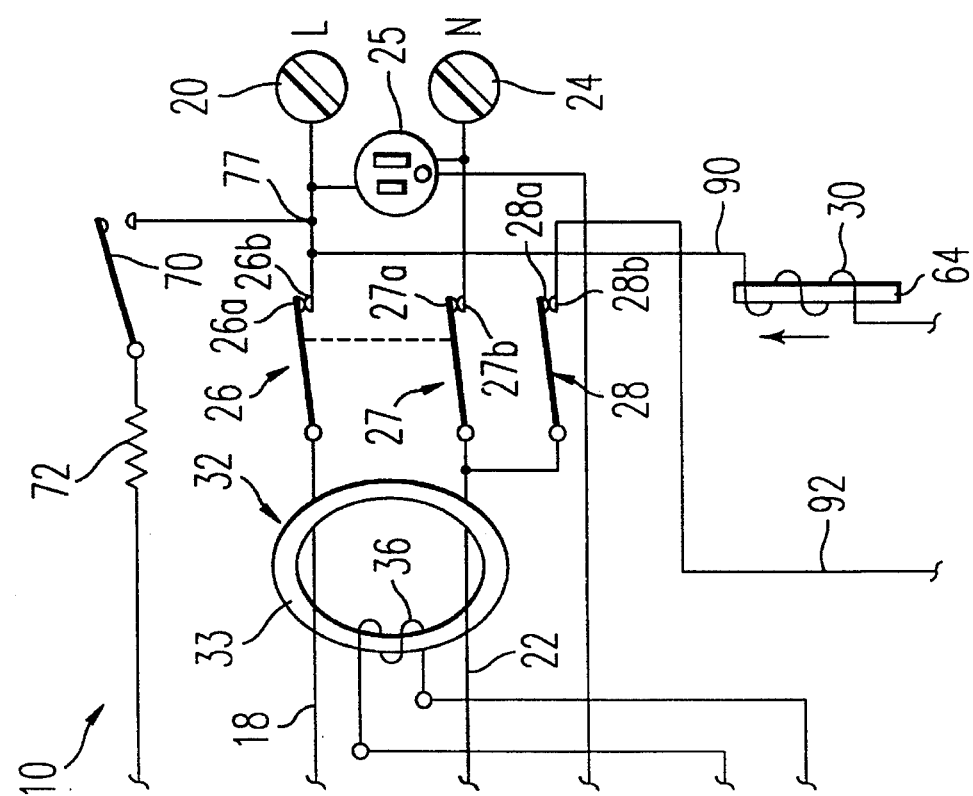
FIG. 4 is a partial schematic diagram similar to those of FIGS. 2 and 3, with the removable contact barrier having been removed to allow normal operation of the GFCI receptacle following verification of proper wiring.

One way in which this can be accomplished is illustrated in FIGS. 2 through 4. As shown in FIG. 2, a removable barrier 76 is inserted between the movable contact 27a and fixed contact 27b of the contact set 27 in the neutral conductor 22 of the GFCI receptacle. This is preferably done while the contact sets 26, 27 and 28 are open, and the contact sets 26, 27 and 28 are then closed by depressing the RESET button on the GFCI receptacle. When this occurs, the contact sets 26, 27 and 28 are in the condition shown in FIG. 3. The contacts 26a and 26b of the first contact set 26 are closed and conducting, and the same is true of the contacts 28a and 28b of the third contact set 28. However, the removable barrier 76 prevents the contact 27a from fully closing against the contact 27b, and hence there is no conduction through the second contact set 27. If it is now assumed that the GFCI receptacle has been miswired by connecting the incoming AC source to the load or feedthrough terminals 20 and 24, it will be observed that closure of the TEST switch 70 will not cause any output to be produced by the sensing transformer 32 since the removable barrier 76 produces an open circuit condition between the neutral GFCI conductor 22 and the neutral load or feedthrough terminal 24. Moreover, both the solenoid trip coil 30 and the amplifier and trip circuit 44 are de-energized despite the closure of the contact set 28, since the barrier 76 prevents power from being provided to those elements when the AC source is connect to the load terminals 20 and 24. Thus, when the TEST pushbutton 70 is depressed, no output will be produced by the amplifier and trip circuit 44 and the contact sets 26, 27 and 28 will remain closed. The resulting failure of the RESET button of the GFCI receptacle to pop out will alert the installer to the fact that a wiring error has occurred. The wiring error can then be corrected by disconnecting the incoming AC source from the load or feedthrough terminals 20 and 24, and reconnecting the incoming AC source to the input or source terminals 12 and 14. The TEST pushbutton 70 is then depressed once again, and the RESET button will pop out to confirm that the receptacle has now been properly wired. Once that occurs, the removable barrier 76 is removed, leaving the GFCI circuit 10 in its normal operating condition as shown in FIG. 4. The contacts 27a and 27b are now touching, and AC power is being provided to the receptacle outlet 25, to the load or feedthrough terminals 20 and 24, and to the solenoid 30 and amplifier and trip circuit 44. It will be apparent that, if the GFCI receptacle 10 had been properly wired in the first instance, the initial depression of the TEST pushbutton 70 would have caused the contact sets 26, 27 and 28 to open, and the installer would then have been in a position to remove the barrier 76 immediately without the need to correct the AC source wiring. If the removable barrier 76 is inadvertently left in place after a successful test of the GFCI receptacle, this will be indicated by the absence of power at the receptacle outlet 25 and at the load or feedthrough terminals 20 and 24. However, the likelihood of the barrier 76 being inadvertently left in place can be reduced by making the barrier as conspicuous as possible to the installer. One way in which this can be accomplished will be discussed shortly in connection with FIGS. 6 through 8.

The removable barrier 76 is shown schematically in FIGS. 2 through 4, since it will be apparent that the barrier can be implemented in a number of different ways. In the preferred embodiment, the barrier comprises a thin, flexible strip of electrically insulating material (such as 0,003 to 0.004 inch thick Mylar tape) which is physically interposed between the faces of the contacts 27a and 27b. The insulating properties of the material are such that electrical conduction between the contacts 27a and 27b is prevented, but the thickness of the material is not sufficient to cause a gap to exist between the other mechanically interconnected contact sets 26 and 28 when the circuit breaker of the GFCI receptacle is latched in the closed or reset position. It will be apparent that a similar result can be achieved by using a wedge, spacer or other type of mechanical arrangement in the latching mechanism of the circuit breaker to maintain a slight air gap between the contacts 27a and 27b until a successful test of the GFCI receptacle is completed. Alternatively, a normally closed pushbutton switch can be placed in series between the contact 27b and the neutral load terminal 24 (or between the node 77 and the line-side load terminal 20), and held in the open or nonconducting position while the TEST switch 70 is depressed. What all of these expedients have in common is that they temporarily maintain an open circuit condition at one of the load terminals 20 and 24 of the GFCI receptacle while the TEST switch 70 is operated in order to prevent false tripping of the GFCI circuit breaker if the AC wiring to the receptacle is reversed, without preventing the TEST switch from tripping the circuit breaker if the receptacle has been properly wired.

Figure 5:
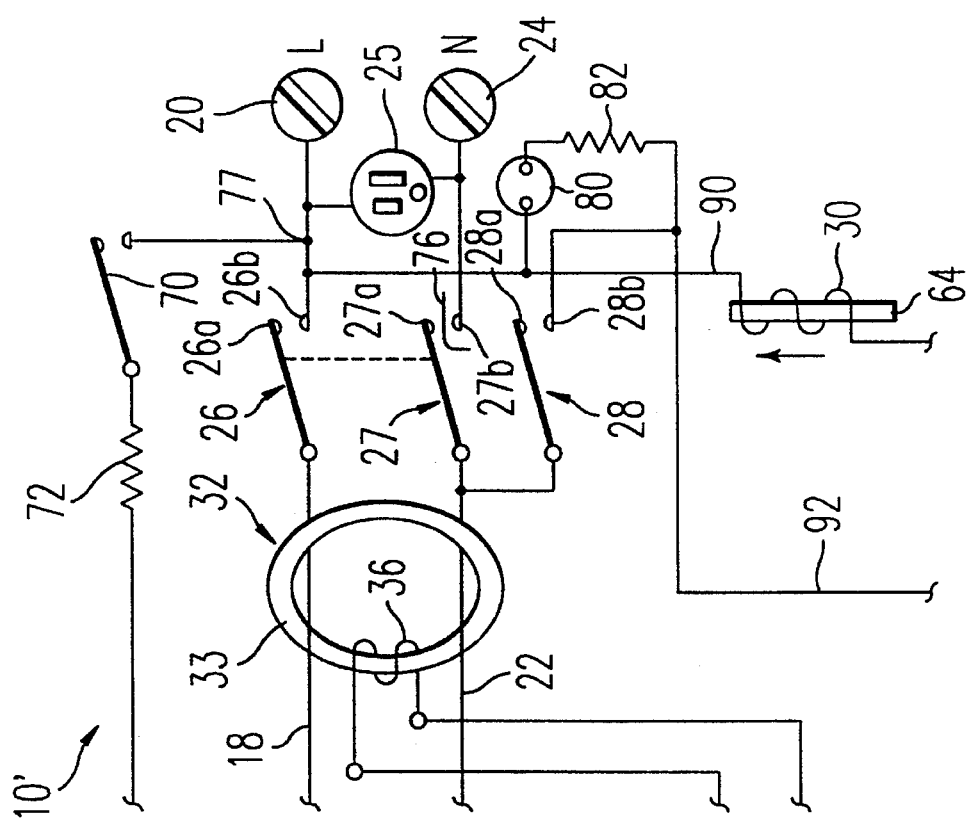
FIG. 5 is a partial schematic diagram similar to those of FIGS. 2 through 4, illustrating a modified embodiment of the GFCI receptacle circuit in which a lamp circuit is included to provide a visual indication that the GFCI receptacle has been properly wired.

A modified GFCI receptacle circuit 10' in accordance with the present invention is illustrated in FIG. 5. In this embodiment, a lamp circuit comprising a neon bulb 80 and a series-connected 100 kilohm current limiting resistor 82 is connected between the load terminal 20 and the line leading to the second contact 28b of the third contact set 28. When the GFCI receptacle has been properly installed and the contact sets 26, 27 and 28 are in their closed or reset positions, the neon lamp 80 will be illuminated. However, if the receptacle has been improperly installed by connecting the incoming AC source to the load or feedthrough terminals 20 and 24 rather than to the source or input terminals 12 and 14, the presence of the removable barrier 76 will prevent the neon bulb 801 from illuminating. The failure of the bulb 80 to illuminate will thus provide an indication of the wiring error without the need to depress the TEST pushbutton 70. Once the wiring error has been corrected, the barrier 76 can be removed and the bulb 80 will then be illuminated whenever the contact sets 26 and 28 are closed. Thus, following successful installation of the GFCI receptacle and removal of the barrier 76, the neon bulb 80 still performs a useful function in indicating that the receptacle is not tripped and that AC power is available at the receptacle outlet 25. The neon bulb 80 may be mounted on the front of the GFCI receptacle housing, adjacent to the TEST and RESET buttons, so that it is easily visible to the installer and ultimate user. Alternatively, the neon bulb may be mounted behind the faceplate of the GFCI receptacle, which preferably consists of a slightly translucent plastic material, so that the neon bulb produces a soft glow when illuminated. It will be appreciated that a light-emitting diode (LED) or a conventional incandescent bulb may, if desired, be substituted for the neon bulb 80 in the GFCI circuit 10' of FIG. 5.

FIG. 6 illustrates the manner in which an existing circuit breaker arrangement in a GFCI receptacle can be modified to include a removable barrier 76 in accordance with the present invention. The existing circuit breaker arrangement shown in FIG. 6, which should be understood as being merely exemplary, is disclosed in more detail in U.S. Pat. No. 4,442,470, to Misencik, which is expressly incorporated herein by reference. In the arrangement shown, the movable contacts 26a and 27a are carried on an armature plate 86. The armature plate 86 has an off-center fulcrum 88, about which it pivots, and is shown in FIG. 6 in the closed position. The electronic circuits 89 (comprising the amplifier and trip circuit 44, bridge circuit 48, SCR 42, varistor 68 and related elements) has one line 90 connected back to the AC line conductor 18 through the solenoid trip coil 30 and contact set 26, and another line 92 connected to the AC neutral conductor 22 through a coiled spring 94 which bears against a fixed element 96 of the receptacle housing and from the spring 94 through a conductive part 98 on which the RESET button 100 of the unit is supported. The conductive part 98 is fixed in relation to the RESET button 100 but has a spring member 102 associated with it against which a latch member 104 works. The latch member 104 has a configuration such that in its closed position the armature plate 86 is held in fixed relation to the RESET button 100 by the latch member and direct contact is made between the latch member 104 at 28a and the conductive element 28b that is in series with the AC neutral conductor 22. In the closed position, as shown, the spring 94 holds the RESET button 100 in a outer position limited by the permissible outward travel of the latch 104 against the armature plate 86, which is in turn held from moving further in the vertically upward direction as shown by the fixed contact 27b.

Upon a ground fault or other trip of the receptacle, including a grounded neutral trip, the electronic circuits 89 operate to energize the trip coil 30 and thereby move the solenoid plunger 64 in the left-hand direction. Solenoid plunger 64 is physically related to the latch member 104 so that upon its movement to the left, it hits against the latch member, releasing it from its closed position under the armature plate 86 so that the armature plate under the influence of a second spring 106 tilts downwardly at its left-hand side about the pivot 88 and opens both of the contact sets 26 and 27. It is significant in this operation that the first point of circuit opening is that of the releasing of the latch member 104 at 28a from the armature plate conductor at 28b, and that necessarily this opening must occur before the contacts 26a and 27a are free to move. The latch member is shown in phantom lines 104' as deflected by the solenoid plunger 64.

On reclosing of the circuit breaker by pushing in the RESET button 100, the latch member 104 slides along the edge of the armature plate 86 until its latch is under the held edge thereof and makes contact again at 28a and 28b. Only then, when the RESET button 100 is manually released, does the closing force of the spring 94 result in the closing of the power contact sets 26 and 27. Necessarily, the opening force provided by the uppermost spring 106 is greater than the closing force provided by the spring 94, which is in the series circuit supplying the electronics 89.

The arrangement described in FIG. 6 is advantageous in that it provides a third set of contacts 28a and 28b without requiring elements separate from the armature plate 86 and latch 104. In addition, the illustrated arrangement insures that the contacts 28a and 28b which supply power to the electronic circuits 89 are the first to open when the circuit breaker is tripped, and the first to close when the circuit breaker is reset. The sequence of opening and closing as between the other contact sets 27 and 28 is less important, although it will generally be preferred to have the AC neutral contacts 27a and 27b open and close prior to the AC line contacts 26a and 26b when the circuit breaker is tripped and reset, respectively.

In accordance with a preferred embodiment of the present invention, the existing circuit breaker arrangement illustrated in FIG. 6 is modified by inserting a removable barrier 76 between the contacts 27a and 27b of the second contact set 27, as shown. As noted previously, the removable barrier 76 is preferably provided in the form of a 0.003 to 0.004 inch thick strip of Mylar tape, which has suitable electrical insulating properties to prevent electrical conduction between the contacts 28a and 28b. The width of the strip (preferably about 0.25 inch) is sufficient to extend across the mating faces of the contacts 27a and 27b, and the length of the strip (preferably about 1.5 inches) is sufficient to allow one end of the strip to protrude out of the housing of the GFCI receptacle. This allows the strip 76 to be withdrawn from between the contacts 27a and 27b by pulling on the exposed portion of the strip, without requiring the installer to open the GFCI receptacle or to locate and manipulate the contacts themselves in order to restore conduction. The strip 76 may be held in place by any desired means, although the pressure of the opposing faces of the contacts 27a and 27b against the strip 76 will ordinarily be sufficient for this purpose. As illustrated in FIG. 6, the protruding portion of the strip 76 is preferably provided with printed indicia 108 which instruct the installer in the proper use and/or removal of the strip. For example, the printed indicia may read "PULL" or "REMOVE AFTER SUCCESSFUL TEST", or other language to that effect.

Figure 8:
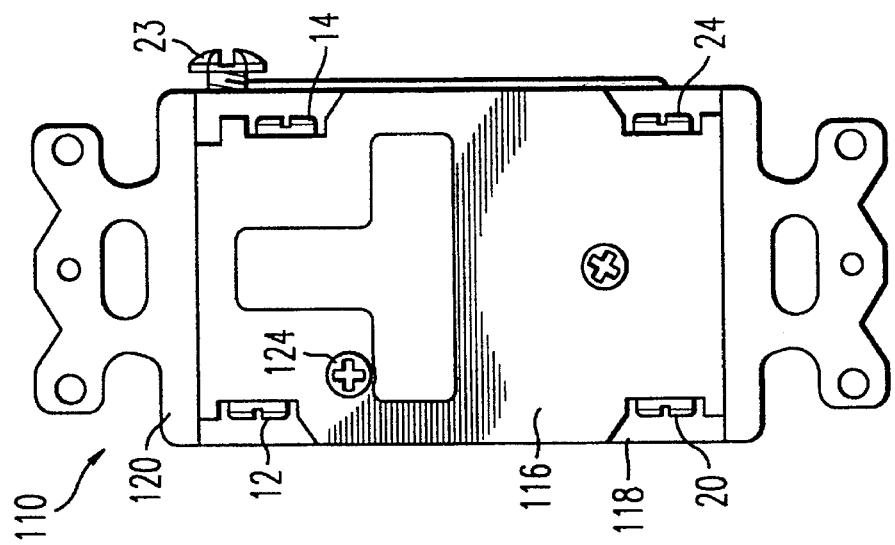
FIGS. 7 and 8 are front and rear views, respectively, showing the external appearance of a GFCI receptacle having a removable contact barrier in accordance with a preferred embodiment of the present invention.
Figure 7:
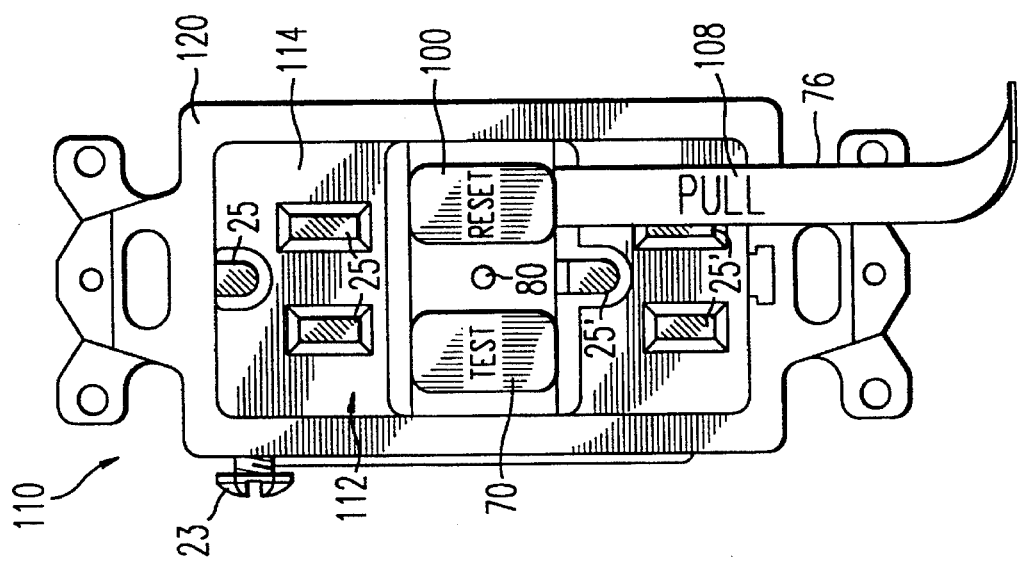

FIGS. 7 and 8 are front and rear views, respectively, of an assembled GFCI receptacle 110 which incorporates a reverse wiring indicator in accordance with the preferred embodiment of the present invention. The GFCI receptacle 110 shown is of the type disclosed in more detail in U.S. Pat. No. 4,739,450, to Misencik, which is expressly incorporated herein by reference, although it will be understood that the present invention is also applicable to other types of GFCI receptacles and to GFCI devices generally. The illustrated receptacle 110 is a duplex receptacle having an insulating housing 112 for enclosing the GFCI circuit 10 or 10' of FIGS. 2 through 6. The housing has a front cover or faceplate 114 with upper and lower three-prong grounded outlets 25 and 25' for receiving standard three-prong AC line cord plugs. The TEST pushbutton 70 and RESET pushbutton 100 protrude through the front cover 114, as shown, so as to be accessible to the user. The neon lamp 80, if provided, is preferably located between the TEST and RESET pushbuttons 70 and 100 on the front cover. The housing also includes a back or bottom cover 116 and a base 118, each made of a molded insulating material. The housing 112 is retained within a metal mounting yoke 120 which is preferably a substantially planar element disposed between the base 118 of the housing 112 and the front cover 114. The grounding terminal screw 23 is connected to a side extension of the yoke 120 for connection to an external grounding wire in the usual manner. The base 118 of the housing 112 and its bottom cover 116 have side recesses in which screw terminals are provided for the AC source connections 12 and 14 and AC load or feedthrough connections 20 and 24. The bottom cover 116 has a recessed fastener 124 for securing the receptacle 110 together.

As illustrated in FIG. 7, the removable barrier or strip 76 preferably protrudes from the front of the housing 112 through a small gap which exists between the RESET pushbutton 100 and the edge of the corresponding opening in the front cover or faceplate 114. The strip 76 is preferably made in a high visibility color, such as red, in order to draw attention to the strip during installation of the GFCI receptacle 110. Following a successful test of the GFCI receptacle 110 by depressing the TEST pushbutton 70 and observing the popping out of the RESET pushbutton 100 (and/or by observing the illuminated condition of the neon lamp 80, if provided, when the receptacle is in its reset or untripped condition), the strip 76 is removed by pulling on the exposed portion carrying the printed indicia 108. This allows the GFCI receptacle 110 to be used normally with the assurance that the receptacle has been properly wired and that ground fault protection is being provided at the receptacle outlets 25 and 25'.

While only a limited number of exemplary embodiments have been chosen to illustrate the present invention, it will be understood by those skilled in the art that various modifications and substitutions can be made therein. All such modifications and substitutions are intended to fall within the spirit and scope of the invention as defined in the appended claims.

What is claimed is:

1. A ground fault circuit interrupter for an AC electrical receptacle, comprising:

first and second input terminals for connection to the line and neutral sides, respectively, of an AC source;

first and second output terminals for connection to the line and neutral sides, respectively, of an AC receptacle outlet;

first and second conductive paths extending, respectively, between said first input terminal and said first output terminal and between said second input terminal and said second output terminal;

first and second sets of electrical contacts connected in said first and second conductive paths, respectively, in order to selectively connect said input terminals to said output terminals when said contact sets are closed and to selectively disconnect said input terminals from said output terminals when said contact sets are open;

a control circuit for causing said first and second contact sets to open in response to an imbalance in current flow through said first and second conductive paths that is indicative of a ground fault condition at an AC load connected to said AC receptacle outlet;

a test switch for selectively connecting one of said first and second input terminals to one of said second and first output terminals, respectively, in order to simulate an imbalance in current flow through said first and second conductive paths and thereby cause said control circuit to open said first and second contact sets; and a removable barrier interposed between the contacts of the contact set that is connected to the output terminal other than that to which said test switch is connected, said removable barrier preventing a return current path from being established through the contacts of said contact set in response to actuation of said test switch under circumstances in which said AC source has been erroneously connected to said output terminals rather than to said input terminals.

2. A ground fault circuit interrupter as claimed in claim 1, wherein said test switch selectively connects said first output terminal to said second input terminal, and wherein said removable barrier is interposed between the contacts of said second contact set.

3. A ground fault circuit interrupter as claimed in claim 1, further comprising a third set of electrical contacts connected between a first power input of said control circuit and the AC source side of the contact set having said removable barrier, a second power input of said control circuit being connected to the AC receptacle outlet side of the contact set not having said removable barrier.

4. A ground fault circuit interrupter as claimed in claim 1, further comprising:

a manually resettable latching mechanism for maintaining said first and second contact sets in the closed state; and an electrical solenoid operated by said control circuit for deactuating said mechanical latching mechanism to open said first and second contact sets.

5. A ground fault circuit interrupter as claimed in claim 1, wherein said removable barrier comprises a strip of electrically insulating material for preventing electrical conduction between said contacts when said contacts are closed.

6. A ground fault circuit interrupter as claimed in claim 1, wherein said removable barrier is provided with printed instructions for use by an installer of the ground fault circuit.

7. A ground fault circuit interrupter as claimed in claim 1, further comprising an indicator circuit connected between the one of said first and second output terminals to which said test switch is connected and the one of said first and second input terminals opposite in polarity to said output terminal, said indicator circuit including a visual indicator which is illuminated prior to removal of said barrier when said AC source has been connected to said input terminals and not to said output terminals.

8. An integral AC receptacle and ground fault circuit interrupter for protecting said receptacle, comprising:

a housing;

first and second terminals carried by said housing for connection to the line and neutral conductors, respectively, of an AC source;

a receptacle outlet carried by said housing for receiving an AC line cord plug, said receptacle outlet having first and second contacts which are electrically connected to said first and second terminals;

third and fourth terminals carried by said housing and electrically connected to the first and second contacts of said receptacle outlet, respectively, for optionally connecting said AC receptacle in parallel with a remote AC receptacle for which ground fault protection is desired;

first and second sets of electrical contacts for selectively connecting said first and second terminals to said first and second contacts, respectively, of said receptacle outlet when said contact sets are in a closed position and for selectively disconnecting said first and second terminals from said first and second contacts, respectively, of said receptacle outlet when said contact sets are in an open position;

a manually resettable latching mechanism for releasably latching said first and second contact sets in the closed position, said latching mechanism being actuated by a RESET pushbutton carried by said housing;

a control circuit for detecting an imbalance in current flow through the line and neutral sides of said receptacle outlet that is indicative of a ground fault condition at an AC load connected to said receptacle outlet;

an electrical solenoid operated by said control circuit for deactuating said latching mechanism to open said first and second contact sets;

a test switch for selectively connecting one of said first and second terminals to one of said second and first contacts, respectively, of said receptacle outlet in order to simulate an imbalance in current flow through said receptacle outlet and thereby cause said control circuit and said electrical solenoid to open said first and second contact sets, said test switch being operated by a TEST pushbutton carried by said housing; and a removable barrier interposed between the contacts of the contact set that is connected to the contact of said receptacle outlet other than that to which said test switch is connected, said removable barrier preventing a return current from being established through the contacts of said contact set in response to actuation of said test switch under circumstances in which said AC source has been erroneously connected to said third and fourth terminals rather than to said first and second terminals.

9. An integral AC receptacle and ground fault circuit interrupter as claimed in claim 8, wherein said test switch selectively connects said first contact of said receptacle outlet to said second terminal, and wherein said removable barrier is interposed between the contacts of said second contact set.

10. An integral AC receptacle and ground fault circuit interrupter as claimed in claim 8, further comprising a third set of electrical contacts connected between a first power input of said control circuit and the AC source side of the contact set having said removable barrier, a second power input of said control circuit being connected to the receptacle outlet side of the contact set not having said removable barrier.

11. An integral AC receptacle and ground fault circuit interrupter as claimed in claim 10, wherein said latching mechanism includes a movable latching member, and wherein said movable latching member forms a part of said third set of electrical contacts.

12. An integral AC receptacle and ground fault circuit interrupter as claimed in claim 8, wherein said removable barrier comprises a strip of electrically insulating material for preventing electrical conduction between said contacts when said contacts are closed.

13. An integral AC receptacle and ground fault circuit interrupter as claimed in claim 12, wherein said housing includes a front cover through which said receptacle outlet and said TEST and RESET pushbuttons are accessible, and wherein said strip extends through said front cover from the interior of said housing to the exterior thereof such that the exterior portion of said strip is visible to an installer of the receptacle.

14. An integral AC receptacle and ground fault circuit interrupter as claimed in claim 13, wherein the exterior portion of said strip is provided with printed instructions for use by an installer of the receptacle.

15. An integral AC receptacle and ground fault circuit interrupter as claimed in claim 8, further comprising an indicator circuit connected between the one of said first and second contacts of said receptacle outlet to which said test switch is connected and the one of said first and second terminals opposite in polarity to said contact, said indicator circuit including a visual indicator which is illuminated prior to removal of said barrier when said AC source has been connected to said first and second terminals and not to said third and fourth terminals.

16. An integral AC receptacle and ground fault circuit interrupter as claimed in claim 15, wherein said housing includes a front cover through which said AC receptacle and said TEST and RESET pushbuttons are accessible, and wherein said visual indicator is carried by said front cover so as to be visible to an installer of the receptacle.

17. A method for testing for improper wiring of an AC ground fault circuit interrupter receptacle having a pair of AC source terminals, a receptacle outlet connected to said source terminals, a pair of AC load terminals connected in parallel with said receptacle outlet, first and second latching contact sets connected in series between said source terminals and said receptacle outlet, a control circuit for releasing said contact sets to disconnect said source terminals from said receptacle outlet and said load terminals in response to a ground fault condition, and a test switch for simulating a ground fault condition by selectively connecting one of said source terminals to the one of said load terminals having opposite polarity, said method comprising the steps of:

latching said first and second contact sets;

temporarily open-circuiting at least one of said AC load terminals in order to prevent said test switch from simulating a ground fault condition when an AC source is connected to said load terminals rather than to said source terminals;

operating said test switch while said open circuit exists at said AC load terminal; and observing whether the operation of said test switch causes said contact sets to be released.

18. The method of claim 17, wherein the step of temporarily open-circuiting at least one of said AC load terminals comprises the step of temporarily inhibiting conduction through the contact set connected to the AC load terminal other than that to which said test switch is connected, and wherein said method further comprises the step of restoring conduction through said contact set if operation of said test switch is observed to cause said first and second contact sets to be released.

19. The method of claim 18, wherein the step of temporarily inhibiting conduction through said contact set comprises the step of interposing a removable barrier between the contacts of said contact set.

20. The method of claim 17, further comprising the step of correcting an improper wiring condition by disconnecting an AC source from said load terminals and reconnecting said AC source to said source terminals in the event that operation of said test switch is observed not to cause said contact sets to be released.

* * * * *